(12) United States Patent
Trentelman

(10) Patent No.: US 6,676,472 B1
(45) Date of Patent: Jan. 13, 2004

(54) LAMP ENVELOPE WITH INTEGRATED OPTICS

(75) Inventor: Jackson P. Trentelman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 480 days.

(21) Appl. No.: 09/704,012

(22) Filed: Nov. 1, 2000

Related U.S. Application Data

(62) Division of application No. 09/112,564, filed on Jul. 9, 1998, now Pat. No. 6,198,213.
(60) Provisional application No. 60/053,550, filed on Jul. 23, 1997, and provisional application No. 60/057,070, filed on Aug. 29, 1997.

(51) Int. Cl.[7] .................................................. H01J 9/24
(52) U.S. Cl. ........................................... 445/26; 445/22
(58) Field of Search .................................... 445/26, 22

(56) References Cited

U.S. PATENT DOCUMENTS 5,608,288 A * 3/1997 Haag ............................. 313/612
5,919,070 A * 7/1999 Khan et al. ..................... 445/25

* cited by examiner

*Primary Examiner*—Kenneth J. Ramsey
(74) *Attorney, Agent, or Firm*—Angela N. Nwaneri

(57) ABSTRACT

A glass envelope for a light-emitting device, a device embodying the envelope, and the method of making the glass envelope by laminating two sheets of glass, one sheet having a continuous channel formed therein, and the other sheet having one or more optical elements formed therein.

6 Claims, 4 Drawing Sheets

LAMP ENVELOPE WITH INTEGRATED OPTICS

RELATED APPLICATION

This application is a division of application Ser. No. 09/112,564, filed Jul. 9, 1998, now U.S. Pat. No. 6,198,213, which claims the benefit of U.S. Provisional Application, Ser. No. 60/053,550, filed Jul. 23, 1997 and Supplemental U.S. Provisional Application, Ser. No. 60/057,070, filed Aug. 29, 1997, both entitled DISCHARGE LAMP WITH INTEGRATED OPTICS, and filed by Jackson P. Trentelman.

Commonly assigned PCT application number PCT/US98/06501 discloses and claims a glass envelope for a light emitting device comprising front and back members, at least one of the members having a continuous channel formed in one surface, the channel including connected sections having different dimensions, the members being hermetically joined to enclose the channel; also, a method of making the glass envelope.

FIELD OF THE INVENTION

In general, the field is light-emitting devices of a discharge nature. More particularly, it is envelopes for lamps, the envelopes comprising two members hermetically sealed together with one member having an optical element formed within its surface.

BACKGROUND OF THE INVENTION

Generally, there are two distinct types of lighting applications. In one, direction of the light is relatively unimportant. In the other, light must be directed in a particular manner subsequent to its generation. The present invention, while suitable for either application, is particularly well suited for the latter where light direction is important.

An example of the latter category is automotive lighting. After light is generated by a lamp, it must be focused/dispersed according to somewhat exacting standards. The requirements for light-directed lamps, such as headlights, sidemarkers, tail lights, brake lights, directionals, hazards, CHMSLs (center high-mounted stop lights), differ. However, they all share the characteristic that their light needs to be directed in some specific manner.

Heretofore, these lights have been constructed of a lamp element (for generating light) and a lens and/or reflecting element (for directing the light). Lamp elements generally fall into three categories: light-emitting diode (LED), incandescent and discharge.

Discharge lamps are generally characterized as having a sealed envelope filled with a gas, the atoms/ions of which, when properly excited, give off light. Lens elements may be categorized as refractive, fresnel, or Total Internal Reflection (TIR). There are also additional elements, such as various reflective surfaces.

An optimum lamp/lens configuration has long been sought by lighting designers. In particular, the automotive market has long desired to incorporate as much light directing capability into the light source (lamp) as possible. This desire has been hampered by the nature of most glass, lamp envelopes One area of recent interest is that of neon lighting for automotive tail lights. For a neon light source to be effective as an automotive rear light, the light output needs to be directed efficiently at the SAE (Society of Automotive Engineers) target area. This area is +/−10° from horizontal and +/−20° from vertical. Minimizing stray light in the non-SAE zone allows the lamp to operate with the greatest energy efficiency and the least electromagnetic interference (EMI).

The traditional approach to accomplish this has been to use a reflector element in combination with a separate, plastic lens having optical elements that focus the light. These optical elements are typically refractive. They are limited in their ability to gather light, and will always require some measurable focal length. The latter, of course, adds depth to the total lamp assembly.

OBJECTS OF THE INVENTION

Therefore, there exists a great need for a lamp having an envelope which can integrate optical elements into the envelope itself. Also, the need exists for a lamp having an envelope which can integrate optical elements into a configuration that does not emit light as a point source. It is an object of the present invention to meet these needs.

It is a further object of the invention to provide a discharge lamp which has the ability to direct light in a preselected pattern or direction through an integrated lens.

It is yet another object of the invention to provide a method for manufacturing a laminated envelope for a discharge lamp which includes a lens element formed in the lamp envelope.

It is an additional object of the invention to provide a combination discharge lamp envelope and TIR lens.

It is another object of the invention to provide a laminated, internally channeled, discharge lamp envelope with integrated optics in direct juxtaposition to the channel.

SUMMARY OF THE INVENTION

The invention resides in part then in a lamp envelope for a light emitting device comprising a first and a second glass member, each member having an inner surface, the first member having a continuous channel that opens on its inner surface, the second member having an integral, optical element formed in at least one surface, the continuous channel and the integral, optical element being aligned so that light generated in the channel is transmitted through the optical element, the glass members being hermetically joined to enclose the continuous channel.

The invention further resides in a discharge lamp embodying a laminated, sheet, lamp envelope. It also resides in a method of making the envelope.

Figure 1A:
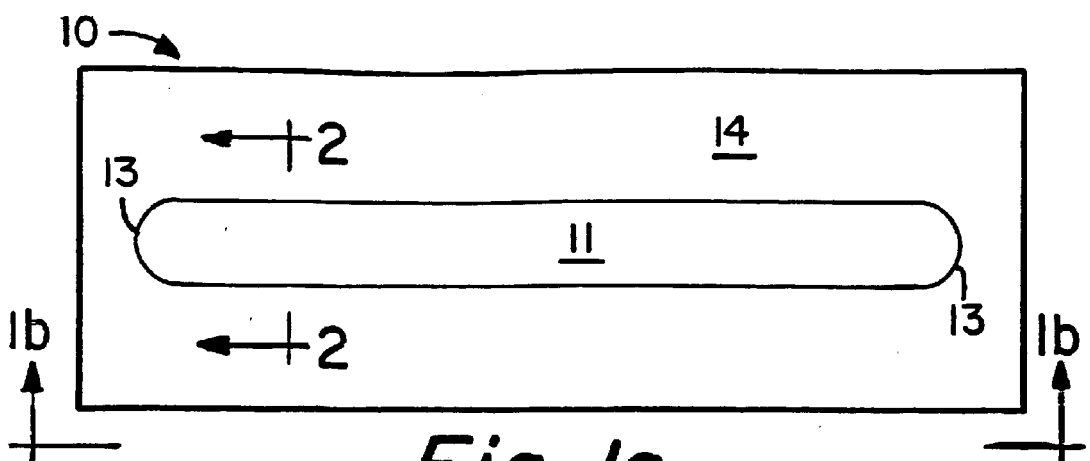
FIG. 1 is a perspective view of a laminated, glass envelope having a single, enclosed channel as heretofore known.

The foregoing drawings, which are incorporated in and constitute part of the specification, illustrate various embodiments of the invention. Together with the description, they serve to explain the principles of the invention. It is to be understood, of course, that the drawings are only illustrative of the invention. They are not intended to indicate scale or relative proportions of the elements shown.

DETAILED DESCRIPTION OF THE INVENTION

The invention will now be explained in greater detail. The description and embodiments will generally center around automotive applications, and neon-based, automotive tail lighting to be specific. It should be noted, however, that the invention is broadly directed to a laminated glass envelope for a discharge lamp with integrated optics. The term "integrated optics" means that an optical element, that is a light directing element, is formed in or on the surface of the lamp envelope.

However, it is not limited to the specific embodiments described herein. For example, the lamp may function as a fluorescent light source when used in combination with the proper internal coating and discharge gas. That embodiment would be especially well suited for downlighting purposes.

Automotive lights typically comprise a light source (lamp) and a lens as separate elements. Optical facets used to focus light have traditionally been incorporated in the lens and take myriad forms. They provide the dual functions of collecting light from the source and directing it according to the appropriate SAE requirements. The exact geometry necessary for each of these functions is often mutually exclusive, thereby requiring a tradeoff by the lighting designer.

The present invention now allows for much greater design flexibility because the light-gathering responsibility of the lens elements can be greatly simplified. A method has been developed for incorporating light-directing ability into the glass component of a lamp. This reduces not only the requirements for light direction needed in a lens, but can reduce cost and focal length. At the other end of the spectrum, sufficient lensing may be accomplished in the glass envelope such that no additional lensing is required. This greatly minimizes assembly cost and time, not to mention yield loss.

A process for manufacturing a glass envelope for a laminated, internally channeled, discharge lamp is described in U.S. patent application Ser. No. 08/851,320, the entirety of which is incorporated herein by reference. The method of that invention comprises: (a) depositing a first ribbon of molten glass on a mold surface, said surface having channels formed therein; (b) causing the molten glass to sag into the mold channels; and (c) depositing a second ribbon of molten glass on top of the first one. The two pieces of glass are laminated together while hot to form a hermetic seal. The second piece of glass is not allowed to sag into the first. Thus, an internal channel (of any configuration desired) is formed between the two pieces.

Figure 1B:
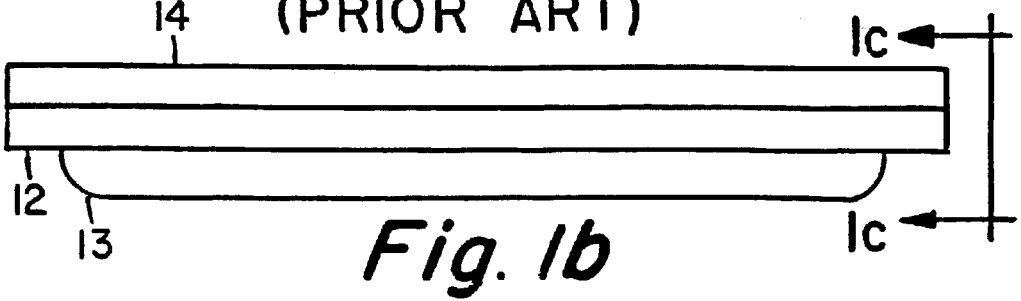
Figure 1C:
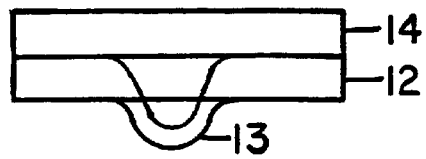

FIG. 1, in the accompanying drawing, is a perspective view of an internally channeled, laminated, glass envelope 10 produced by that process. Envelope 10 is shown with a single, linear channel 11 formed in a bottom, glass layer 12. Normally, channel 11 will have several lengths in a serpentine array. However, a single length channel is shown here in the interest of clarity.

Regardless of the configuration of channel 11, electrode connections 13—13 are provided at opposite ends of channel 11. A second layer of glass 14 is then deposited on the first layer 12, but is not allowed to sag in a mold channel as was the first layer. The two glass layers 12 and 14 are laminated together to hermetically enclose channel 11.

Figure 2:
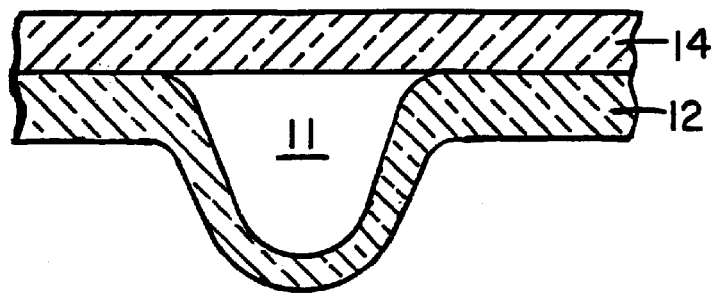
FIG. 2 is a cross-sectional view taken along line 2—2 in FIG. 1.

FIG. 2 is a cross-sectional view taken along line 2—2 in FIG. 1 to better show the nature of the envelope components.

The instant invention involves the basic process just described as a starting point. That process is modified by adding a step of forming an optical element, e.g. a lens, at a predetermined location in the second glass sheet. The optical element is located facing the source of light in the channel, that is, in registry therewith. This enables the light to be gathered and directed by the optical element.

The companion, related application noted above describes in detail a preferred, envelope configuration for a lamp wherein the internal channel comprises alternating, large and small, or restricted, sections all connected to form a single channel. As there described in detail, the small, or restricted, sections become the primary light generating sources in a discharge lamp. In such an envelope, the optical element is located in registry with the light generating, restricted section, whereby the light source and the optical element can cooperate as intended.

Figure 3:
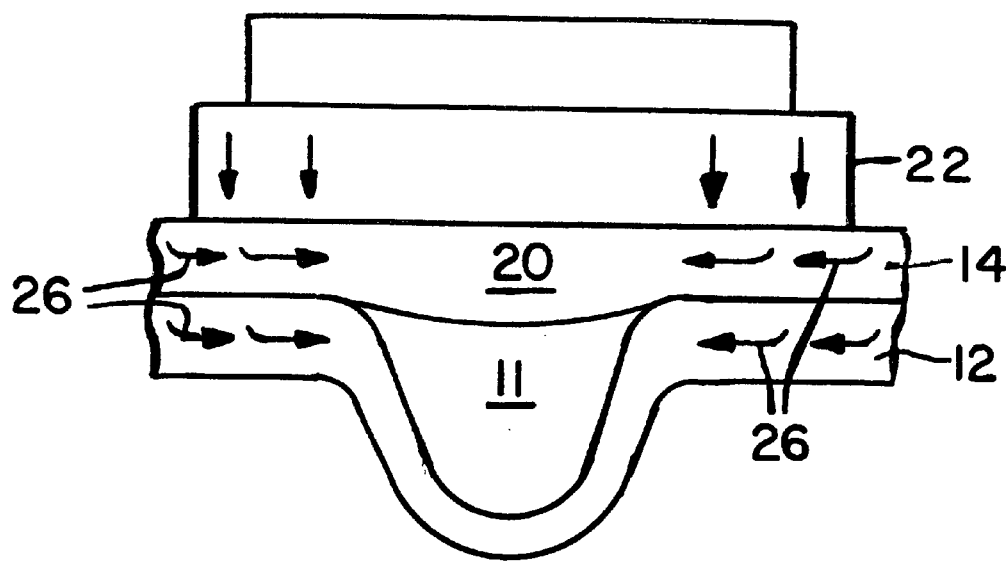
FIG. 3 is also a cross-sectional view taken along line 2—2 of FIG. 1, but with the force of a plunger added to displace glass to form a lens in accordance with the present invention.

FIG. 3 embodies the cross-sectional view taken along line 2—2 of FIG. 1. This view illustrates a preferred method of forming an optical element, convex lens 20, on the inner surface of second glass layer 14. This method involves applying pressure in areas on either side of sheet 14 adjacent to the location for lens 20 to be formed.

Pressure may be applied through a plunger 22 to the proper areas on glass sheet 14. It is, of course, required that glass sheet 14 be at a temperature such that lateral glass flow will occur as indicated by arrows 26.

By carefully controlling conditions, such as pressure, viscosity, temperature, surface chemistry, and geometry, any desirable lens shape, such as a bi-convex, plano-convex, plano-concave, or bi-concave lens, can be formed by glass being displaced laterally into the desired area. In some instances, either internal pressure, external vacuum applied through the plunger, or a combination of the two, may be utilized to cause the glass surface to conform to the plunger surface.

Figure 4:
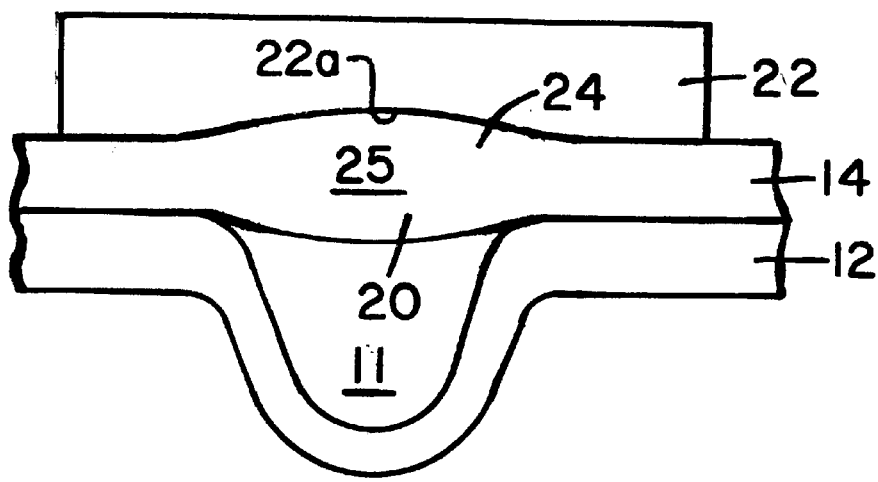
FIG. 4 is a cross-sectional view showing formation of a bi-convex lens in accordance with the present invention.

Alternatively, the bottom surface of the plunger 22 may be formed such that it will impart a particular shape in the top surface of sheet 14 above lens 20. For example, if the bottom surface of plunger 22 has a concavity 22a formed therein, a convex lens 24 may be formed in the top surface of sheet 14. FIG. 4 shows a bi-convex lens 25 which may be formed when sufficient glass flow, to fill the concavity, and to form the convex surface on the bottom side of the top sheet, is available.

Figure 5:
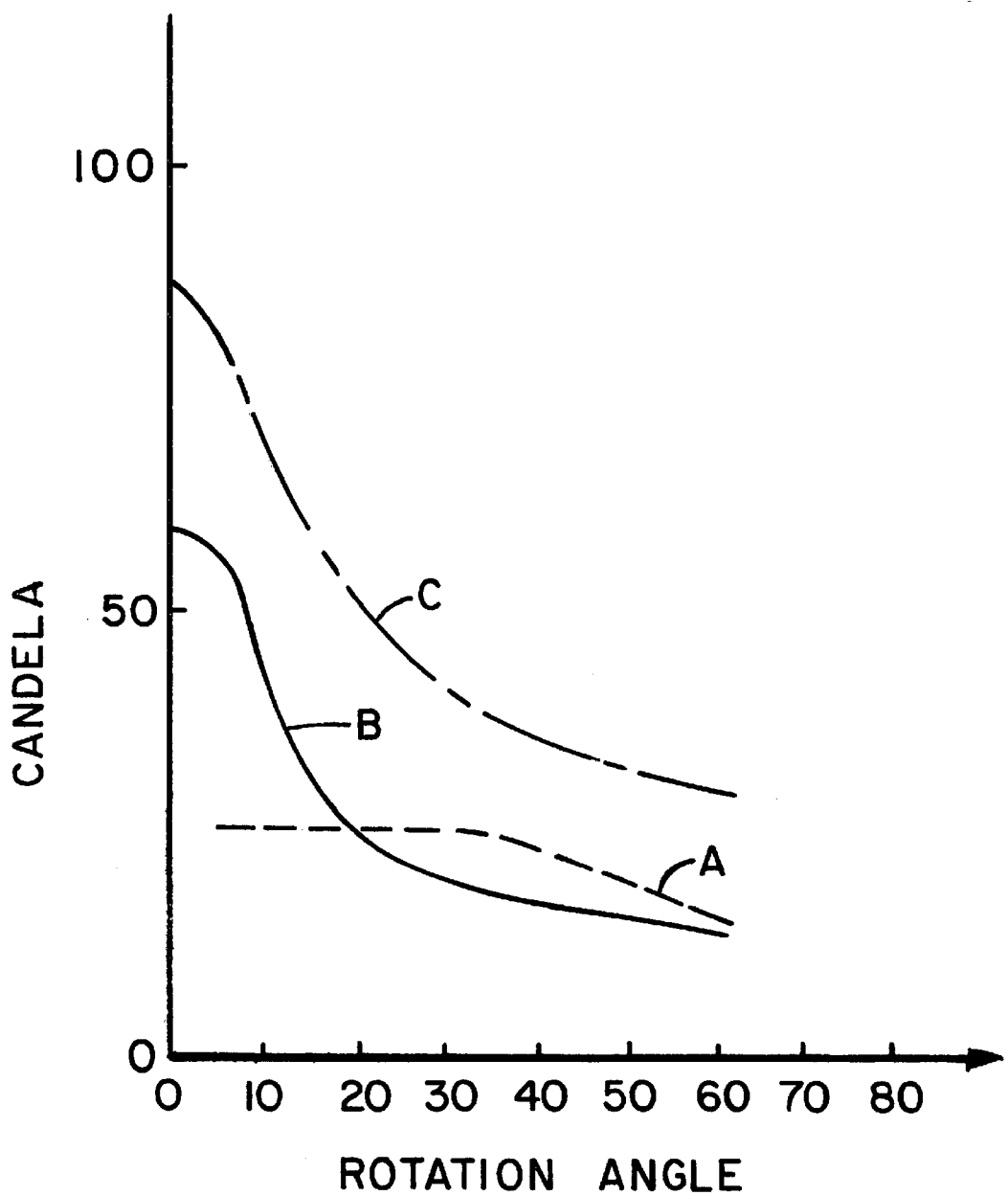
FIG. 5 is a graphical representation comparing performance of different lamp structures.

FIG. 5 is a graphical representation illustrating the advantage attained by the instant invention. It is based on data measured on three 10 cm (4 inch) diameter lamps intended for rear lighting on trucks. Each lamp was a laminated, discharge lamp having essentially the same internal channel and an external lens arrangement for truck light application. One lamp was not provided with any optic element integrally formed in the glass surface. The other two lamps had a bi-convex lens formed in one sheet of the lamp as shown in FIG. 4. One lamp also was provided with a reflective coating.

In FIG. 5, the angle of rotation from a centerpoint is plotted in degrees on the horizontal axis. Light output, in candela at the centerpoint, is plotted on the vertical axis. Curve A is based on the conventional lamp without any integrated optics on the glass envelope. Curves B and C are based on lamps having a bi-convex lens formed on the envelope to gather light generated in the lamp channel. The light measured for Curve C also had the benefit of the reflecting coating. The angular distribution of the lamps with integrated optics is clearly much more peaked, indicative of the light gathering ability of the lenses. The lensed geometry is capable of putting considerably more light in the SAE target zone which comprises an area of +/−10 degrees from the horizontal and +/−20 degrees from the vertical.

In order to achieve the optimum attributes of the lensing in a long term manufacturing sense, various process variables should be optimized. These include tooling geometry, plunger alignment, pressing pressure, and dwell time. In turn, these variables are dependent on, and must be related to, the glass composition, sheet thickness, temperature (generally between 900 and 1200 C.), vacuum application, timing and, of course, the dimensions of the product to be made.

Geometry is one aspect of successfully forming a useful lens. The amount of flat area on either side of the channel from which glass originates is an item to be optimized. If this flat is too small, there isn't sufficient glass available to create a useful lens. If the flat is too wide, too much glass is displaced. This will either fill the cavity or create non-lensing lumps. Part of the geometry equation is the glass thickness available for displacement. The glass top sheet must be sufficiently thick to contain fluid, and thus displaceable, glass between its surfaces. A sheet thickness in the range of about 1.5 to 2.5 mm, in those portions of the sheet that are workable, is generally suitable for the effective creation of convex lenses.

The lensing opportunities with the present method are not limited to one dimension. It is only necessary that the glass has a source from which to emanate during the application of pressure. With a proper amount of glass available, lenses over very short length channels can be formed. Such lenses gather light not only in the transverse plane, but also in the longitudinal plane.

An alternative embodiment of the instant invention combines the inventive, laminated lamp with a Total Internal Reflection (TIR) lens. One of the truly novel and useful aspects of this invention is the ability to manipulate lamp formation in a manner such that light emanating has a predetermined, angular distribution. A TIR lens is described in U.S. Pat. No. 5,404,869 issued to Parkyn, Jr. et al., the entirety of which is herein incorporated by reference. TIR lenses have the ability to gather light from large, solid angles and redirect it efficiently.

Certain applications, such as LCD backlighting, have stringent, uniform, light distribution requirements. For an LCD, the preferred source distribution is non-isotropic. This results in enough light directed toward large angles that it can be observed as bright. In addition, this also requires a short focal length. By properly providing the glass thickness distribution in a channel of the laminated sheet, it is possible to create the desired defocused source. An internally channeled lamp, in combination with a TIR lens, accomplishes this.

Figure 6:
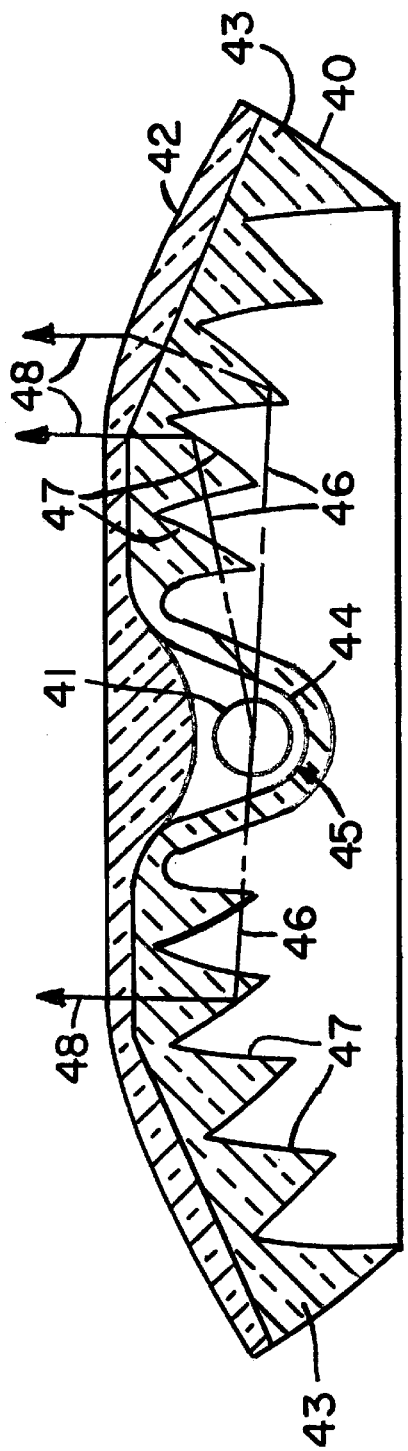
FIG. 6 illustrates an envelope of the instant invention in combination with a TIR lens.

FIG. 6 is a schematic representation of a TIR lens 40 designed to be used in conjunction with an internally channeled, laminated, glass light source 41. Light source 41 comprises two glass sheets 42 and 43 as shown in FIG. 3. Sheet 43 has a channel 44 formed therein.

Circle 45 represents the excited gas contained within channel 44. The light, represented by dotted lines 46, emanates from the lamp in a dispersion pattern set by the geometry imparted to the channel and integrated optics. As it does so, it impinges the TIR lens 40. Specifically, it impinges the internal facets 47, and is redirected externally as shown by arrows 48.

In FIG. 6, the lamp is oriented such that the light is emanating through the channel side to the TIR lens. It may also be desirable to rotate the lamp 180 degrees such that the opposite side is closer to the TIR lens. This choice would be made based on the end lighting need and the particular requirements of the TIR lens.

In this aspect of the invention, it is possible to combine TIR and glass lamination technology. The internal facets of the TIR lens may be molded into one of the glass sheets, thus eliminating the need for a separate TIR lens.

Figure 7:
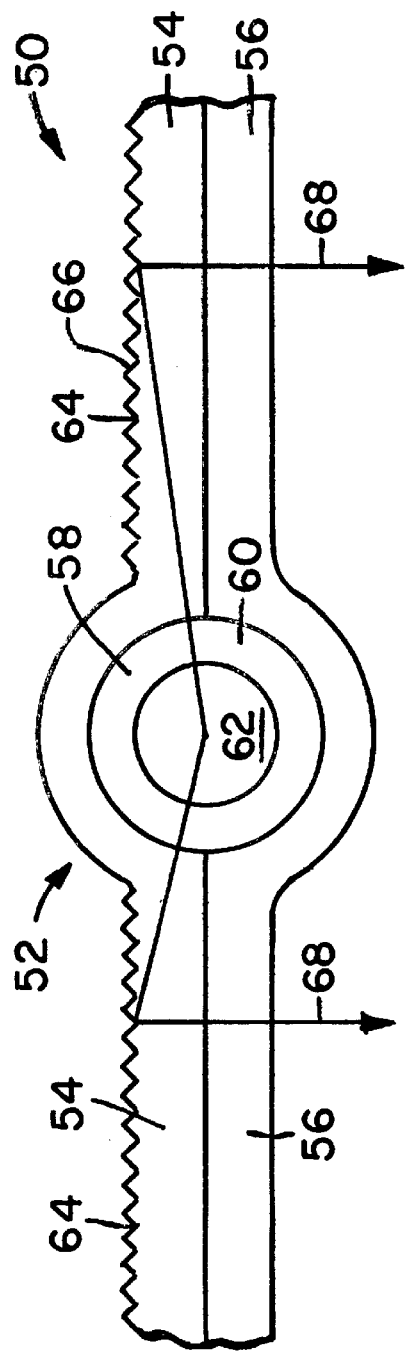
FIG. 7 is a cross-sectional view illustrating another embodiment of the present invention.

FIG. 7 is a schematic representation of another embodiment of integrated optics in a laminated sheet lamp. The lamp is generally designated by the numeral 50. Lamp 50 comprises an envelope 52 formed by internally channeled, laminated sheets 54 and 56. Each sheet has a channel, 58 and 60 respectively. The channels form a tubular region containing a discharge gas 62, such as neon, to generate light.

Upper sheet 54 has a plurality of microscopic grooves 64 formed in its outer surface. The adjacent sides of an adjacent pair of grooves 64 form a ridge 66 of triangular cross-section. Light rays 68, generated by discharge gas 62, strike a ridge 66 and are redirected though sheet 56 to form a band of light.

Having thus described the basic concept of the invention, it will be readily apparent to those skilled in the art that the foregoing detailed disclosure is presented by way of example only, and the invention is not limited thereto. Various alterations, improvements and modifications will occur to those skilled in the art, though not expressly stated herein. These modifications, alterations, and improvements are intended to be suggested hereby, and are within the spirit and scope of the invention. Accordingly, the invention is limited only by the following claims and equivalents thereto.

I claim:

1. A method of making a glass envelope for a light emitting device which comprises:
   (a) depositing a first sheet of molten glass on a mold having a surface contour that includes a continuous channel enclosed by a peripheral portion of the surface,
   (b) forming a continuous channel in the first sheet of glass that substantially corresponds to the channel in the mold,
   (c) depositing a second sheet of glass over the channel in the first sheet and in contact with the peripheral portion of the surface,
   (d) forming an optical element in the second glass sheet that is in registry with at least a portion of the channel in the first glass sheet, and
   (e) hermetically joining the two glass sheets to enclose the channel of the first sheet.

2. A method in accordance with claim 1 which further comprises forming a continuous channel in the first glass sheet that has alternating small and large dimensioned sections and forming the optical element(s) in registry with the small dimension section(s).

3. A method in accordance with claim 1 which comprises forming the optical element in the second glass sheet by holding that sheet at a viscosity such that lateral glass flow can occur, and applying pressure to the glass sheet in a zone on either side of the spot where the optical element is to be formed, whereby lateral glass flow towards the optical element location occurs and the desired element contour forms within the glass surface.

4. A method in accordance with claim 1 which comprises applying a vacuum to the glass surface at the desired, optical element location, either alone or in conjunction with another element forming step.

5. A method in accordance with claim 1 that further comprises evacuating the enclosed channel and backfilling with a gas that emits radiation when subjected to an electrical discharge.

6. A method in accordance with claim 1 which further comprises sealing an electrode into each end of the enclosed channel.

* * * * *